F. REED.
RESILIENT TIRE.
APPLICATION FILED AUG. 28, 1912.
1,072,260. Patented Sept. 2, 1913.
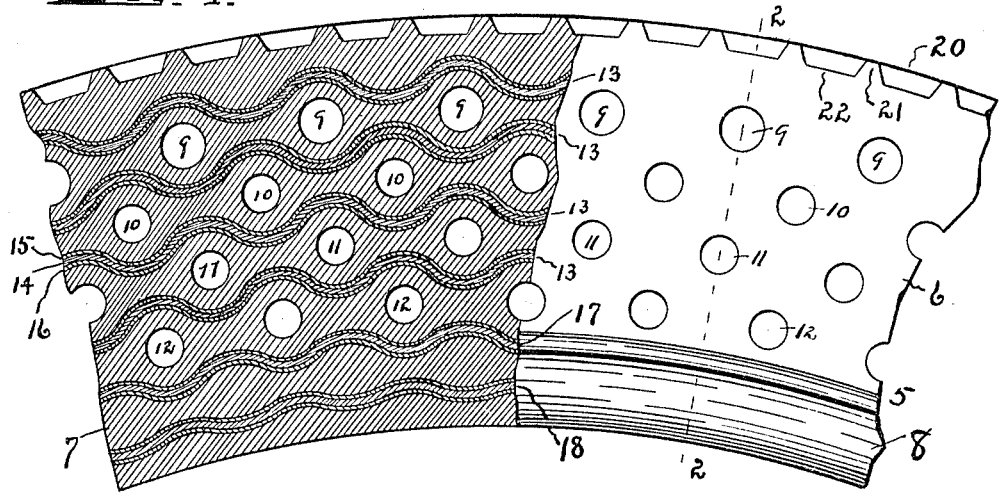
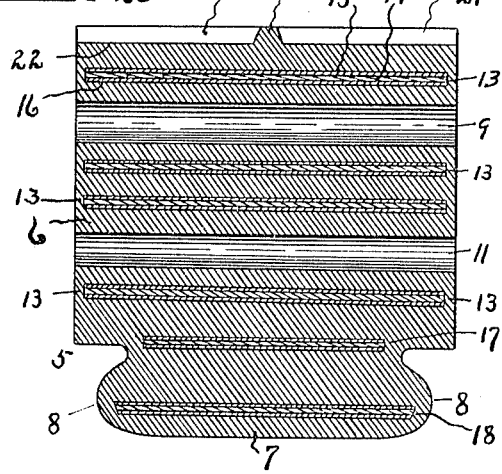
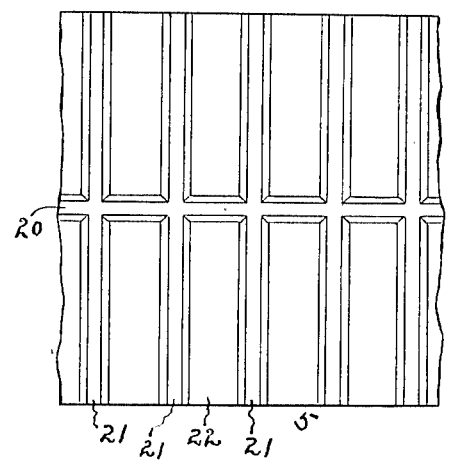
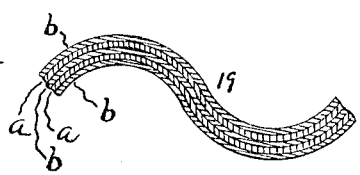
Witnesses
C. E. Clark
B. B. McCoy
Inventor
Frank Reed,
By
Hiram A. Sturges,
Attorney

UNITED STATES PATENT OFFICE.

FRANK REED, OF OMAHA, NEBRASKA.

RESILIENT TIRE.

1,072,260.  Specification of Letters Patent.  Patented Sept. 2, 1913.

Application filed August 28, 1912.  Serial No. 717,468.

*To all whom it may concern:*

Be it known that I, FRANK REED, a citizen of the United States, residing at Omaha, in the county of Douglas and State of Nebraska, have invented certain new and useful Improvements in Resilient Tires, of which the following is a specification.

This invention relates to improvements in resilient tires, and has for its object to provide a tire of this class which may be conveniently manufactured, will be durable in wear, and to be so constructed that a comparatively high degree of resiliency may be provided upon the periphery of a wheel within a limited space.

The invention consists of the novel construction, combination and arrangement of parts as described herein and claimed and as illustrated in the drawing, wherein,—

Figure 1 is a side view showing a part of the resilient tire, a portion being in longitudinal section. Fig. 2 is a transverse section on line 2 2 of Fig. 1. Fig. 3 is a plan view showing a part of the tire. Fig. 4 is a detail illustrating, in longitudinal section, a modified form of a layer.

Referring now to the drawing for a more particular description, numeral 5 indicates a tire consisting of a body portion 6 substantially rectangular in cross-section and a base 7 formed, in cross-section, with convexed end-portions 8.

The herein described tire is particularly useful in connection with horseless vehicles, and is employed as a substitute for the combined outer and inner tires in general use; and it will be understood that the base 7 may be supported upon the rim (not shown) of a vehicle wheel.

The principal part of the tire is preferably constructed of rubber. In order that it may have greater elasticity, numerous perforations or apertures are formed transversely in body-portion 6, these being arranged in the series indicated respectively at 9, 10, 11, and 12, each of the apertures of a series being disposed at the same distance from the base 7; and the arrangement is such that each of the apertures of each series will be disposed in alinement with an aperture of an alternate series, radially of the wheel, and on this account when the wheel passes over an obstruction, a high degree of elasticity is provided, the yielding of the rubber, of course, depending upon the size of the alining apertures.

In order that a resistance may be provided for stresses which are directed radially, as when the wheel moves over an obstruction, an elastic arch is disposed over each of the transverse apertures, and these arches are best provided by the corrugated layers 13. Layers 13 are corrugated or curved longitudinally, and it will be seen by reference to Figs. 1 and 2 that they form an arcuate wall above and parallel with each aperture. They are formed of flexible resilient material, as the attenuated strip 14, which may be of sheet metal disposed between fabric sheets 15 and 16.

The tire, as described, may be conveniently manufactured. By use of adhesive material the fabric sheets and the metallic part of a layer are held together, and the fabric adheres to the rubber at the time the tire is formed. The endless layers thus provided are flexible and elastic and they reinforce the tire in such a manner that the tire, while having comparatively a limited thickness and width, has a high degree of elasticity, and by its use the pneumatic tire may be dispensed with.

The layers have a less width than the tire, and therefore they may be wholly surrounded by or "embedded" in the rubber. At 17 and 18 are indicated elastic reinforcing members. They may be constructed of the same material as layers 13, and are of serpentine, endless form. Member 17 is disposed outwardly of the convexed ends 8 of the base, and member 16 is disposed within the base 7. They operate to sustain the stresses when the tire encounters obstructions, and tend to prevent spreading of the base and the rim in which the base is generally disposed.

While I have explained in detail the construction of layers 13, 17 and 18 I do not limit myself to exactness, and the number of metallic sheets in each layer may be greater or less as may be desired.

At 19 (Fig. 4) is indicated an elastic reinforcing member consisting of elastic metallic sheets *a a*, disposed in alternation between fabric or rubber sheets *b;* and layer 19 may be substituted for layers 13, 17 and 18, if desired. These layers are useful in the construction of the tires used upon the wheels of trucks, or other wheels of heavy construction.

At 20 is indicated a longitudinal ridge formed upon and at the middle of the periphery of the tire, transverse ridges 21 also being formed upon and at longitudinal intervals of said periphery to form therebetween the depressed panels 22, these parts, when the tire is in use, tending to prevent skidding.

Having fully explained the several parts and their uses a further description relating to operation is not necessary.

What I claim and desire to secure by Letters Patent is,—

1. A vehicle tire comprising an elastic body portion formed with a plurality of rows of transverse openings, the openings of a row being arranged in staggered relation to the openings of an adjacent row, and a plurality of elastic metallic members of serpentine formation extending longitudinally of the body portion and embedded therein, the outwardly bowed portions of one serpentine member being opposed to the inwardly bowed portions of the adjacent serpentine member, said openings being located between the opposed concave portions of said serpentine members.

2. A vehicle tire comprising an elastic body portion formed with a plurality of rows of transverse openings the openings of a row being arranged in staggered relation to the openings of an adjacent row, and a plurality of elastic metallic members of serpentine formation extending longitudinally of the body portion and embedded therein, the outwardly bowed portions of one serpentine member being opposed to the inwardly bowed portions of the adjacent serpentine member, said openings being located between the opposed concave portions of said serpentine members, the outer of said metallic members being of more pronounced serpentine form than the inner.

In testimony whereof I have affixed my signature in presence of two witnesses.

FRANK REED.

Witnesses:
HIRAM A. STURGES,
A. F. CLARK.

Copies of this patent may be obtained for five cents each, by addressing the "Commissioner of Patents, Washington, D. C."